May 14, 1940.    E. E. HOLKE    2,200,448
ELECTRICAL CONNECTOR
Filed March 1, 1939
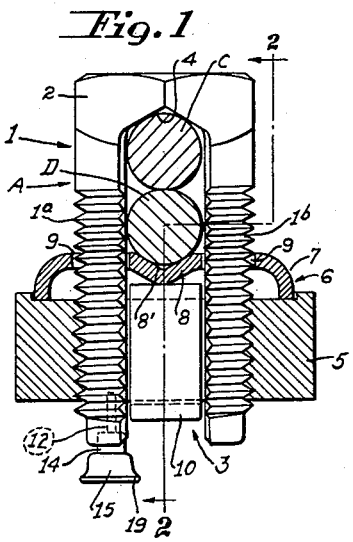
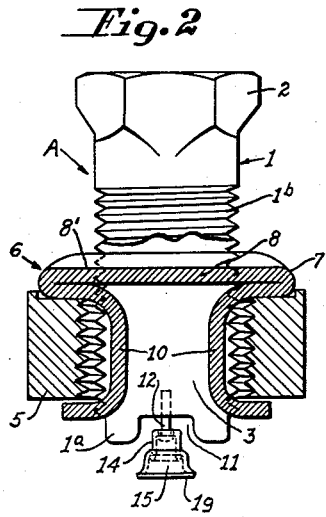
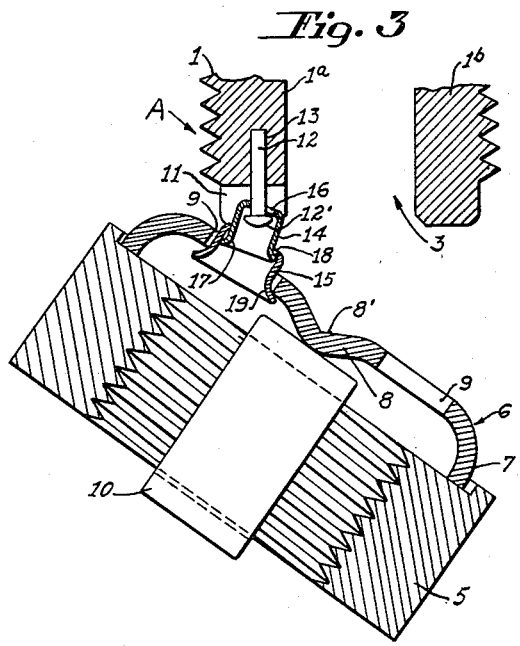
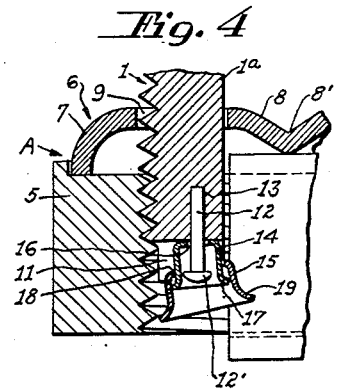
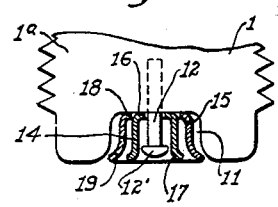
INVENTOR
EUGENE E. HOLKE
BY E. m. Harrington,
ATTORNEY Patented May 14, 1940

2,200,448

UNITED STATES PATENT OFFICE 2,200,448

ELECTRICAL CONNECTOR

Eugene E. Holke, St. Louis, Mo., assignor to James R. Kearney Corporation, St. Louis, Mo., a corporation of Missouri Application March 1, 1939, Serial No. 259,145

5 Claims. (Cl. 24—243)

This invention relates generally to electrical connectors of the split bolt type adapted for single-hand application to overhead or other electrical conductors, and more specifically to an electrical connector of this type which includes improved means for retaining in association with the split bolt of the connector a nut and washer assembly which forms a part of the connector, the predominant object of the invention being to provide a connector of the type mentioned with means for retaining the nut and washer assembly of the connector in association with the split bolt thereof, when the nut and washer assembly is out of screw-threaded engagement with respect to the split bolt, which is so constructed and arranged and is capable of such use that the task of taping the connector after it has been applied to a conductor is facilitated.

Prior to this invention patents were granted on various types of nut retainers for split bolt connectors, but most of these nut retainers are faulty in that they include rigid portions which extend outwardly beyond portions of the connectors. The disadvantage incident to the presence of such rigid, outwardly extended, nut retainer portions is that they interfere with the taping of the connectors when it is desired to tape the connectors after their application to conductors. The connector disclosed herein is provided with a nut retainer which is so made that it may be collapsed and nested in a cavity formed in a leg of the split bolt of the connector so that no portion thereof extends beyond the normal surface of the connector. Because of this arrangement the connector of which the improved nut retainer forms a part may be taped with no more difficulty than would be encountered in taping a split bolt connector which did not include a nut retainer.

Fig. 1 is an enlarged view partly in vertical section and partly in elevation illustrating a connector constructed in accordance with this invention.

Fig. 2 is a section taken on line 2—2 of Fig. 1, the conductors shown in Fig. 1 being omitted in Fig. 2.

Fig. 3 is an enlarged fragmentary section illustrating the manner in which the nut and washer assembly of the connector is retained in association with the split bolt of the connector when said assembly is out of screwthreaded engagement with respect to said split bolt.

Fig. 4 is a fragmentary section illustrating the improved nut retainer as it appears when the nut and washer assembly is being applied to the split bolt of the connector.

Fig. 5 is a fragmentary section-elevation showing the nut retainer as it appears when it is collapsed and nested in the recess provided therefor in a leg of the split bolt.

In the drawing, wherein is shown for the purpose of illustration, merely, one embodiment of the invention, A designates the improved connector generally. The connector A includes a bolt 1 which provides the body portion of the connector, said bolt having a head portion 2 and being provided with a longitudinal, medial slot 3 which extends inwardly from the outer end of the bolt shank to the under or inner side of the bolt head to provide the bolt with spaced shank portions $1^a$ and $1^b$. The slot 3 terminates at the headed end of the bolt in a groove 4 which traverses the under side of the bolt head and provides a seat for a conductor C.

Threaded on the split, screwthreaded shank portion of the bolt 1 is a nut 5 which has permanently associated therewith a washer 6, the connection between the washer and the nut being such as to permit the nut to rotate relative to the washer. The washer preferably comprises an annular portion 7 which surrounds the spaced shank portions $1^a$ and $1^b$, and the outer, marginal portion of the annular portion 7 is turned to provide a skirt portion which bears edgewise upon the upper face of the nut 5. The washer 6 includes also a bridge portion 8 which, by preference, is longitudinally grooved to provide a seat 8′ for a conductor D, and the presence of this bridge portion provides the washer with segmental openings 9 through which the correspondingly shaped shank portions $1^a$ and $1^b$ pass. The washer 6 is provided with a pair of fingers 10, which are extended from the skirt portion of the washer at points adjacent to the opposite ends of the bridge portion 8, these fingers being projected initially inwardly and then downwardly and outwardly through the bore of the nut. The free ends of the fingers underlie the lower face of the nut and maintain the nut and washer in such assembled relation as to permit the nut to rotate about the screwthreaded bolt shank while the washer moves in a non-rotatable manner longitudinally of said bolt shank. Portions of the bridge portion 8 and fingers 10 are disposed in the bolt slot when the nut and washer are mounted on the shank portion of the bolt and are of substantially the same width as the bolt slot, and accordingly said portions of said bridge portion and fingers serve as spacers to prevent the shank portions 1ᵃ and 1ᵇ from being drawn toward each other when the nut is turned up tightly thereon.

The shank portion 1ᵃ has a cavity 11 formed therein at its lower end and associated with said shank portion 1ᵃ so that its outer portion is disposed in said cavity 11 is a pin 12 which is provided with a head 12' at its outer end. The pin 12 may be secured to the shank portion 1ᵃ in any suitable manner, such, for instance, as by forming an opening 13 in said shank portion and driving the inner portion of said pin into said opening, as shown to the best advantage in Figs. 3 and 5. Loosely supported by the pin 12 is a washer engaging structure which is comprised of a pair of substantially bell-shaped elements 14 and 15. The element 14 is smaller in diameter than the element 15, said element 14 having an aperture 16 formed through its top wall through which the pin 12 passes and said aperture is of substantially greater diameter than the shank of the pin and of less diameter than the head 12' of the pin whereby said element 14 is loosely supported on the lower portion of said pin. At its lower end the element 14 is provided with a flared portion 17. The element 15 embraces the element 14, said element 15 being provided with an opening 18 formed in its top wall through which the element 14 extends. The opening 18 is of substantially greater diameter than the main portion of the element 14 so that said elements 14 and 15 are capable of relative longitudinal movement as well as relative rocking movement. Also because of the presence of the lower flared portion 17 of the element 14, which is larger in diameter than the opening 18, the elements 14 and 15 are prevented from being accidentally disengaged from each other. The element 15 is also provided with a lower flared portion which is designated by the reference character 19, and this flared portion 19 is of a diameter which is larger than the width of any part of the segmental opening 9 through which the shank portion 1ᵃ extends.

When the improved connector is to be applied to a conductor or conductors, the nut is unscrewed from the bolt shank whereupon the nut and its associated washer will assume the approximate positions in which they are shown in Fig. 3, the nut retainer holding the nut and washer assembly in loosely connected relation with respect to the bolt because of the fact, as already stated herein, that the flared lower portion 19 of the element 15 is too large in diameter to pass through the segmental opening 9 through which the shank portion 1ᵃ of the bolt extends when the nut and washer assembly is mounted on the bolt. Because of the loose connection between the element 14 and the pin 12 and between the elements 14 and 15 swivel connections are provided between the parts mentioned which permit the nut and washer assembly to be moved to positions to provide a lateral opening beneath the lower end of the shank of the bolt which leads to the open lower end of the slot 3 of the bolt shank, and which is of sufficient size to permit free passage therethrough of conductors to be engaged by the connector.

When the bolt of the connector has been passed over the conductor or conductors to which it is to be attached the nut and washer assembly is moved toward the outer end of the bolt shank to cause the shank portions 1ᵃ and 1ᵇ to pass through the segmental openings 9 of the washer. The nut is then threaded on the bolt shank, the loose connections between the pin and the element 14 and between the elements 14 and 15 permitting the screwthreads of the nut to displace the element 15 laterally as shown in Fig. 4, so that the lower flared portion 19 thereof may not interfere with free rotation of said nut with respect to the bolt shank. When the nut and washer assembly have been drawn up to tightly engage the conductors, as shown in Fig. 1, the elements are collapsed and nested within the cavity 11, as shown in Fig. 5, whereupon the connector may be conveniently taped because of the entire absence of any parts of the nut retaining means which project outwardly beyond the normal surface of the connector.

I claim:

1. A nut retainer for an electrical connector which comprises a body member having a screwthreaded shank provided with a cavity therein and including a nut assembly adapted for application to said screwthreaded shank of said body member, comprising an elongated element fixed to the shank of said body member of the connector so that a portion thereof is disposed within said cavity of said shank, and a structure supported on and guided for movement by said elongated element, said structure being guided by said elongated element for movement beyond said cavity of said shank to engage the nut assembly of the connector when said nut assembly is detached from said shank, and said structure being guided by said elongated element for movement to a position within said cavity when said nut assembly is screwthreadedly mounted on the shank of the body member of the connector to permit convenient taping of the connector.

2. A nut retainer for an electrical connector which comprises a body member having a screwthreaded shank provided with a cavity therein and including a nut assembly adapted for application to said screwthreaded shank of said body member, comprising an elongated element fixed to the shank of said body member of the connector so that a portion thereof having a head at its outer end is disposed within said cavity of said shank, and a structure supported on and guided for movement by said elongated element, said structure being guided by said elongated element for movement beyond said cavity of said shank to engage the nut assembly of the connector when said nut assembly is detached from said shank, and said structure being guided by said elongated element for movement to a position entirely within said cavity when said nut assembly is screwthreadedly mounted on the shank of the body member of the connector to permit convenient taping of the connector.

3. A nut retainer for an electrical connector which comprises a body member having a screwthreaded shank provided with a cavity therein and including a nut assembly adapted for application to said screwthreaded shank of said body member, comprising an elongated element fixed to the shank of said body member of the connector so that a portion thereof having a head at its outer end is disposed within said cavity of said shank, and a structure supported on and guided for movement by said elongated element, said structure being comprised of a plurality of telescopically arranged elements which are guided by said elongated element for movement to an extended position beyond said cavity of said shank to engage the nut assembly of the connector when said nut assembly is detached from said shank, and said structure being guided by said elongated element for movement to a collapsed position entirely within said cavity when said nut assembly is screwthreadedly mounted on the shank of the body member of the connector to permit convenient taping of the connector.

4. A nut retainer for an electrical connector which comprises a body member having a screwthreaded shank provided with a cavity therein and including a nut assembly adapted for application to said screwthreaded shank of said body member, comprising an elongated element fixed to the shank of said body member of the connector so that a portion thereof having a head at its outer end is disposed within said cavity of said shank, and a structure supported on and guided for movement by said elongated element, said structure being comprised of a plurality of telescopically arranged elements which are guided by said elongated element for movement to an extended position beyond said cavity of said shank to engage the nut assembly of the connector when said nut assembly is detached from said shank, and said structure being guided by said elongated element for movement to a collapsed position entirely within said cavity when said nut assembly is screwthreadedly mounted on the shank of the body member of the connector to permit convenient taping of the connector, said telescopically arranged elements of said structure being loosely supported by said elongated element and being loosely related with respect to each other so that said structure may move laterally relative to its normal position in alinement with the axis of said elongated element.

5. A nut retainer for an electrical connector which comprises a body member having a screwthreaded shank provided with a cavity therein and including a nut assembly adapted for application to said screwthreaded shank of said body member, comprising an elongated element fixed to the shank of said body member of the connector so that a portion thereof having a head at its outer end is disposed within said cavity of said shank, and a structure supported on and guided for movement by said elongated element, said structure being comprised of a plurality of substantially bell-shaped telescopically arranged elements which are guided by said elongated element for movement to an extended position beyond said cavity of said shank to engage the nut assembly of the connector when said nut assembly is detached from said shank, and said structure being guided by said elongated element for movement to a collapsed position entirely within said cavity when said nut assembly is screwthreadedly mounted on the shank of the body member of the connector to permit convenient taping of the connector, said telescopically arranged elements of said structure being loosely supported by said elongated element and being loosely related with respect to each other so that said structure may move laterally relative to its normal position in alinement with the axis of said elongated element.

EUGENE E. HOLKE.